United States Patent Office 3,507,815
Patented Apr. 21, 1970

3,507,815
URETHANE FOAM FORMULATIONS CONTAINING HYDROLYTICALLY STABLE SILOXANE-OXYALKYLENE COPOLYMERS
Donald L. Bailey, Sistersville, W. Va., and Anton S. Pater, Williamsville, N.Y., assignors to Union Carbide Corporation, a corporation of New York
No Drawing. Application Feb. 8, 1965, Ser. No. 431,194, which is a continuation-in-part of application Ser. No. 116,265, June 12, 1961. Divided and this application July 25, 1966, Ser. No. 567,376
Int. Cl. C08g 22/46, 53/10
U.S. Cl. 260—2.5                     10 Claims This application is a division of application Ser. No. 431,194, filed Feb. 8, 1965, and the latter application is a continuation-in-part of application Ser. No. 116,265, filed June 12, 1961, now abandoned.

This invention relates to polyurethane resin foams. More particularly, the invention is directed to improved foam formulations from which polyurethane resins can be produced. These improved formulations contain hydrolytically stable siloxane-oxyalkylene copolymers as foam stabilizers. The invention is also directed to a process for producing polyurethane resin foams from these improved formulations and to the self-supporting foams so produced.

The term "foam stabilizer" as used herein with reference to polyurethane resin foam formulations means a material which has the two-fold properties of (a) helping to produce a foam in the formulation and (b) preventing collapse of the foam until the foamed product has developed sufficient gel strength for the foam to become self-supporting.

The hydrolytic stability of the foam stabilizers useful in this invention provides many useful and unexpected advantages. For example, the hydrolytically stable siloxane-oxyalkylene copolymers useful as foam stabilizers in the present invention can be stored alone or mixed with other conventional components of a polyurethane foam formulation for long periods of time without undergoing any significant hydrolytic decomposition. This hydrolytic stability applies to both moisture in the air and water which may be present in the foam formulation.

The hydrolytic stability of the siloxane-oxyalkylene copolymers useful in this invention is particularly important when the foam stabilizer must be in contact with both water and organic amine catalysts of the type conventionally used in urethane foam formulations, since it is well known that hydroxide ions derived from an organic base tend to catalyze the hydrolysis of a hydrolytically unstable material.

Another unexpected advantage of the hydrolytically stable siloxane-oxyalkylene copolymers useful in this invention is their lack of reactivity with the metal organic compounds conventionally used as catalysts in polyurethane foam formulations. Hydrolyzable foam stabilizers heretofore known can react with the metal organic catalysts resulting in the mutual destruction of the catalyst and the foam stabilizer.

The hydrolytically stable siloxane-oxyalkylene copolymers useful in this invention are also extremely efficient foam stabilizers and result in the production of foamed products of high quality even when used in amounts as small as 0.1 weight percent based on the total weight of the foam formulations.

The hydrolytic stability of the siloxane-oxyalkylene copolymers useful in the improved formulations of this invention results from the fact that the oxyalkylene moieties are connected to the siloxane moieties through hydrolytically stable silicon-carbon bonds. These stable compounds are to be contrasted with siloxane-oxyalkylene copolymers wherein the oxyalkylene moieties and siloxane moieties are connected through silicon-oxygen-carbon bonds. A silicon-oxygen-carbon linkage can be relatively easily hydrolyzed particularly where the water contains hydroxide ions. Also siloxane-oxyalkylene copolymers containing silicon-oxygen-carbon bonds have been found to react with metal organic compounds of the type used as catalysts in polyurethane foam formulations.

It is therefore an object of this invention to provide an improved composition suitable for use in the production of polyurethane resin foams which composition contains a hydrolytically stable siloxane-oxyalkylene copolymer as a foam stabilizer.

A further object of this invention is to provide a foam stabilizer for polyurethane foam formulations which does not undergo degradation in the presence of moisture or basic materials ordinarily present in such formulations.

A further object of this invention is to provide a foam stabilizer for polyurethane foam formulations which does not react with metal organic catalysts present in such formulations.

A still further object of this invention is to provide a process for producing polyurethane resin foams and to provide polyurethane foams of high quality.

According to the present invention, there is included as a hydrolytically stable foam stabilizer in foam forming polyether-isocyanate compositions a siloxane-oxyalkylene block copolymer having recurring oxyalkylene groups linked to recurring siloxane groups through silicon-carbon bonds.

The copolymers useful in the formulations of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention).

The siloxane-oxyalkylene copolymers employed as foam stabilizers in this invention are represented by the formula:

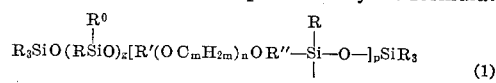

(1)

wherein R is a monovalent hydrocarbon group, $R^0$ is hydrogen or a monovalent hydrocarbon group, R' is hydrogen or a monovalent hydrocarbon group, R'' is a divalent hydrocarbon group, $g$ has a value of at least 0, $m$ is an integer that has a value of at least 2, $n$ is a number that has a value of at least 1 (preferably at least 4), $p$ is a number that has a value of at least 1, there are not more than three hydrogen atoms represented by $R^0$ in the copolymer (preferably less than one or none) and at least 25 weight percent of the groups represented by $(OC_mH_{2m})$ are oxyethylene groups.

Illustrative of the monovalent hydrocarbon groups that are represented by $R^0$, R and R' in Formula 1 are the alkenyl groups (for example, the vinyl and the allyl group); the cycloalkenyl groups (for example, the cyclohexenyl group); the alkyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups such the the styryl, tolyl and n-hexylphenyl groups, and the cycloalkyl groups (for example, the cyclohexyl group).

Illustrative of the divalent hydrocarbon groups represented by R'' in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenyl-ethylene group). Preferably, the divalent hydrocarbon group is an alkylene group containing from two to four successive carbon atoms. These divalent hydrocarbon groups are linked to a silicon atom of the siloxane block by a silicon-to-carbon bond to an oxygen atom of the oxyalkylene lock by a carbon-to-oxygen bond.

Illustrative of the oxyalkylene groups that are represented by $(OC_mH_{2m})$ in Formula 1 are the oxyethylene, oxy-1,2-propylene, oxy-1,3-propylene, oxy-2,2-dimethyl-1,3-propylene, oxy-1,10-decylene groups, and the like. The oxyalkylene blocks in the copolymers useful in this invention can contain one or more of the various types of oxyalkylene groups provided at least 25 weight percent of such groups are oxyethylene groups. By way of illustration, the oxyalkylene blocks can contain only oxyethylene groups or both oxyethylene and oxypropylene groups, or other combinations of oxyethylene groups the various types of oxyalkylene groups.

A preferred class of siloxane-oxyalkylene copolymers that can be employed as foam stabilizers in this invention are those represented by the formula:

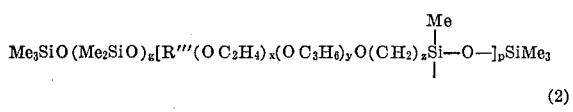

(2)

wherein Me is a methyl group, $g$ has a value from 3 to 25 inclusive, R''' is hydrogen or an alkyl group containing from 1 to 4 carbon atoms inclusive, $x$ has a value from 1 to 25 inclusive (preferably from 4 to 25 inclusive), $y$ has a value from 0 to 15 inclusive, at least 25 weight percent (preferably at least 50 weight percent) of the groups represented by $—(OC_2H_4)_x(OC_3H_6)_y—$ are oxyethylene groups, Z has a value from 2 to 3 inclusive and $p$ has a value from 1 to 10 inclusive.

Specific siloxane-oxyalkylene copolymers that can be employed as foam stabilizers in this invention are those having the average formulae:

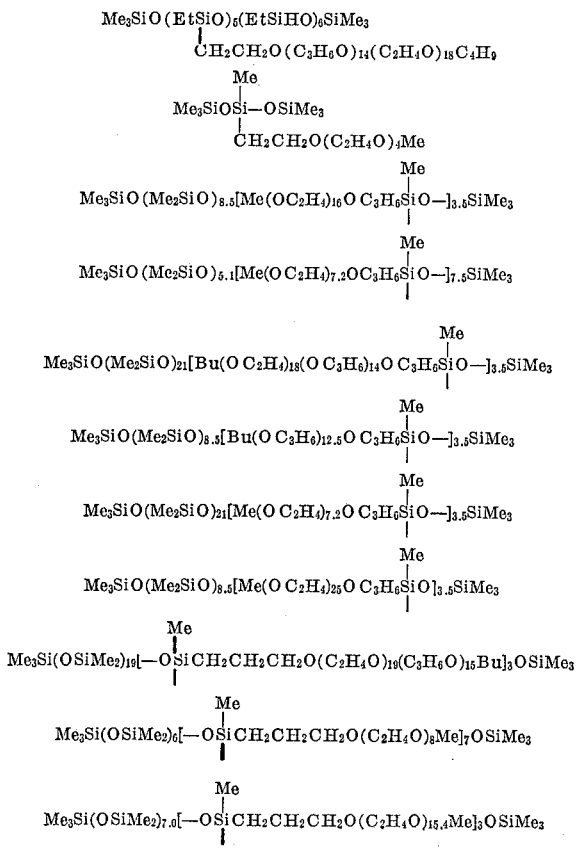

In the above formulae "Me" represents the methyl group, "Et" represents the ethyl group and "Bu" represents the butyl group.

The siloxane-oxyalkylene copolymers useful as stabilizers in the foam formulations of this invention can be prepared by several convenient methods. For example, the copolymers useful in this invention can be produced by a process that involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process is referred to herein as the "metathesis process" and it involves a metathesis reaction than can be illustrated by the following equation:

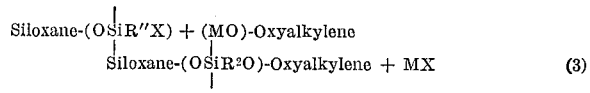

(3)

wherein R'' is a divalent hydrocarbon group, X is a halogen atom, M is an alkali metal, Siloxane denotes a siloxane block and Oxyalkylene denotes an oxyalkylene block.

The copolymers useful in this invention can also be produced by another process (termed the "addition process") that involves forming a mixture of a siloxane polymer containing a hydrogen-siloxy group

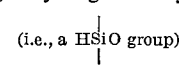

(i.e., a $H\overset{|}{\underset{|}{Si}}O$ group)

an oxyalkylene polymer containing an alkenyloxy end-blocking or chain terminating group and a platinum catalyst and heating the mixture to a temperature sufficiently elevated to cause the siloxane polymer and the oxyalkylene polymer to react to produce the copolymer. The latter-mentioned reaction is an addition reaction that can be illustrated by the following equation:

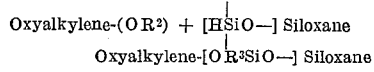

wherein Oxyalkylene and Siloxane have the meaning defined for Formula 3, $OR^2$ is an alkenyloxy group (such as the vinyloxy and the allyloxy groups) and $R^3$ is an alkylene group containing at least two successive carbon atoms. The addition process is applicable to the production of those copolymers of this invention containing a siloxane block that is linked to an oxyalkylene block by an alkylene group that has at least two successive carbon atoms (e.g., an ethylene, 1,2-propylene or 1,2-butylene group and the like). Useful catalysts contain from 0.001 to 5.0 weight percent platinum based on the reactants. Especially useful catalysts are platinum supported on the gamma allotrope of alumina and chloroplatinic acid. Liquid organic compounds in which the starting polymers are mutually soluble, such as toluene, can be used in the addition process. The temperature employed can vary from 25° C. to 200° C.

Polyurethane foams are prepared by mixing together an organic polyisocyanate and a polyether containing at least two hydroxyl groups and thereafter developing the foaming reaction. The mixture is foamed in the presence of a catalyst and foam stabilizer (a hydrolytically stable siloxane-oxyalkylene block copolymer in accordance with this invention) by means of a blowing agent such as water, a fluorocarbon or other inert gas, or mixtures thereof.

This invention encompasses foam formulations containing hydrolytically stable siloxane-oxyalkylene block copolymers which formulations are suitable for the production of rigid, semi-rigid flexible polyurethane foams. This invention also encompasses the use of such formulations in the methods for preparing polyurethane foams known as the one-shot, semi-prepolymer and prepolymer techniques, all of which are well known.

Thus, the foam formulations of this invention contain a major amount of (1) a polyether containing at least two hydroxyl groups (or mixture of such polyethers) and (2) an organic polyisocyanate (or mixture of organic polyisocyanates), (3) a catalytic amount of a catalyst (or mixture of catalysts), (4) a minor amount of a blowing agent, and (5) a foam stabilizing amount of hydrolytically stable siloxane-oxyalkylene block copolymer (or mixture of such block copolymers). The formulations can also contain water when water is used as a blowing agent either alone or in conjunction with fluorocarbon or other inert gas blowing agents.

The final foam formulation contains all the above ingredients regardless of the order of mixing in the process steps which precede the foam developing reaction. That is, the final combination of ingredients in the foam formulation is independent of the process (one-shot, semi-prepolymer or prepolymer) even though the order of addition or partial reactions between some ingredients may differ from one process to another.

Another relative amounts of polyether (or mixture of polyethers), isocyanate (or mixture of isocyanates), catalyst (or combination of catalysts), and blowing agent (or combination of blowing agents) to be used in foam formulations is well known in the art and depends upon the process employed (one-shot, semi-prepolymer or prepolymer) and the type of foam desired (rigid, semi-rigid or flexible). The relative amounts of hydrolytically stable siloxane-oxyalkylene block copolymer or mixture of such copolymers used in the formulations of this invention is discussed hereinbelow.

The polyethers which are used in preparing the polyurethane foams include the linear and branched chain polyethers which have a plurality of acyclic ether oxygens and contain at least two hydroxyl groups. The polyethers have molecular weights, based on their hydroxyl value, ranging from 250 to 7500.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide useful polyethers include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, rhammoside, and the like, and polyethers prepared by the reaction of alkylene oxides with sucrose.

Further included are polyethers prepared by reacting a 1,2-alkylene oxide such as ethylene oxide, propylene oxide, butylene oxide or mixtures thereof with mononuclear polyhydroxy-benzenes such as resorcinol, pyrogallol, phloroglucinol, hydroquinone, 4,6-di-t.-butylcatechol, catechol, orcinol, methylphoroglucinol, 2,5,6-trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene, 2,3-dihydroxyphenanthrene, and the like.

Other polyethers which can be employed are those obtained by reacting 1,2-alkylene oxides or mixtures thereof with polynuclear hydroxybenzenes such as the various di, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p-hydroxyphenyl)methane and the various diphenols and diphenylol methanes disclosed in United States Patents Nos. 2,506,486 and 2,744,882, respectively.

Exemplary triphenylol compounds which can be employed include the alpha, alpha, omega-tris(hydroxyphenyl)alkanes such as:

1,1,3-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes,
1,1,10-tris(hydroxyphenyl)decanes,
and the like.

Tetraphenylol compounds which can be reacted with 1,2-alkylene oxides include the alpha, alpha, omega, omega-tetrakis(hydroxyphenyl)alkanes such as:

1,1,2,2,-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)--2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimenthylphenyl)octanes;
1,1,10,10-tetrakis(hydroxyphenyl)decanes;

and the corresponding compounds which contain substituent groups in the hydrocarbon chain such as:

1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;
and the like.

Other particularly useful polyethers which can be employed are the ethylene oxide propylene oxide and butylene oxide adducts of phenol-formaldehyde condensation product materials such as the novolaks.

Novolaks are mixtures of polynuclear compounds of the diphenylmethane type of structure such as, 4,4'-dihydroxydiphenylmethane and 2,4'-dihydroxydiphenylmethane. Such compounds are free from methylol groups and are formed by the Baeyer reaction of phenol and formaldehyde. In a typical synthesis, novolaks are prepared by condensing one mole of phenolic compounds, such as phenol or cresol, with 0.8 mole of an aldehyde, such as formaldehyde or furfural, under acid conditions at a temperature around 160° C. to 170° C. The polynuclear products frequency contain four to eight units and can contain twelve or more units. Novolaks, as such, are non-curable, thermoplastic resins.

Further included are polyethers prepared by reacting one or more of the alkylene oxides above noted with acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine, dipropylenetriamine, and the like. A particularly suitable polyether is the propylene oxide addition product of diethylenetriamine.

Other suitable polyethers include the 1,2-alkylene oxide derivatives of mononuclear primary amines such as: o-, m-, and p-phenylenediamine; 2,4- and 2,6-diaminotoluene; 2,6-diamino-p-xylene; 4,6-diamino-m-xylene; 2,4-diamino-m-xylene; 3,5 - diamino - o - xylene; isohexyl-p-phenylenediamine; 3,5 - diaminotoluene, and the like; polynuclear and fused aromatic polyamines such as 1,4-naphthylenediamine; 1,5-naphthylenediamine; 1,8-naphthylenediamine; benzidine, toluidine; 4,4'-methylenedianiline; 3,3' - dimethoxy-4'4' - biphenyldiamine; 3,3'-dichloro-4,4' - biphenyldiamine; 3,3' - dimethyl - 4,4' - biphenyldiamine; 4,4' - ethylenedianiline, 4,4' - ethylidenedianiline; 1-fluorenamine; 2,5-fluorendiamine; 2,7-fluorenediamine; 1,4-anthradiamine; 3,3'-biphenyldiamine; 3,4-biphenyldiamine; 9,10 - diaminophenanthrene and 4,4 - diaminoazobenzene.

Higher functional mono- and polynuclear polyamines which also can be reacted with 1,2-alkylene oxides to provide useful polyether starting materials include 2,4,6-triaminotoluene; 2,3,5 - triaminotoluene; 5,6 - diaminoacenaphthene, 4,4',4" - methylidynetrianiline, 3,5-diaminobenzoic acid, triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by interaction of aromatic monoamines with formaldehyde or other aldehydes.

In addition to the hydroxyl-containing polyethers described above, many other classes of compounds containing active hydrogen atoms can react with organic isocyanates to produce urethane resin foams. Examples of other operable active hydrogen-containing compounds are hydroxyl-containing polyesters, polyamides, polyamines, and the like. The hydrolytically stable siloxane-oxyalkylene block coploymers described above are also foam stabilizers for urethane foam formulations containing such polyesters, polyamides, polyamines, and the like.

The molecular weight of the polyether used should range from about 250 to about 7500 depending upon the characteristics desired in the foamed urethane product. As a general guide, cellular urethane foams of maximum rigidity are prepared by the use of polyethers having a molecular weight range of about 250 to 1500; for semi-rigid foams the molecular weight of the polyether should be about 800 to 1800; and for flexible open-cell foams the polyether should be of increased chain length and have a molecular weight of about 1800 to 5000.

A variety of organic isocyanates can be employed for reaction with the polyethers above described to provide urethane foams. Preferred isocyanates are polyisocyanates and polyisothiocyanates of the general formula:

$$Q(NCY)_i$$

wherein Y is oxygen or sulfur, $i$ is an integer of two or more and Q is an alkylene, substituted alkylene, arylene or substituted arylene radical, a hydrocarbon, or substituted hydrocarbon containing one or more aryl —NCY bonds and one or more alkyl —NCY bonds. Q can also include radicals such as —QZQ— where Z can be a divalent moiety such as —O—, —O—Q—O—, —CO—, —CO$_2$—, —S—, —S—Q—S—, —SO$_2$—, and the like. Examples of such compounds include hexamethylene diisocyanate, 1,8 - diisocyanato - p - methane, xylene diisocyanates, (OCNCH$_2$CH$_2$CH$_2$OCH$_2$)$_2$, 1-methyl-2,4-diisocyanatocyclohexane, phenylene diisoycanates, tolylene, diisocyanates, chlorophenylene diisocyanates, diphenylmethane-4,4'-diisocyanate, naphthalene-1,5-diisocyanate, triphenylmethane - 4,4',4"-triisocyanate, xylene-alpha, alpha'-diisothiocyanate, and isopropylbenzene-alpha-4-diisocyanate.

Further included are dimers and trimers of isocyanates and diisocyanates and polymeric diisocyanates of the general formulas:

$$Q(NCY)_i \text{ and } [Q(NCY)_i]_j$$

in which $i$ and $j$ are integers of two or more, as well as compounds of the general formula:

$$L(NCY)_i$$

in which $i$ is one or more and L is a monofunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCY group, isocyanates derived from sulfonamides (QSO$_2$NCO), cyanic acid, thiocyanic acid, and compounds containing a metal—NCY group such as tributyltin isocyanate.

The amount of isocyanate employed will depend upon the density of the urethane foam and the amount of cross-linking desired. In general, the total —NCO equivalent to total active hydrogen equivalent of the polyether should be such as to provide a ratio of 0.8 to 1.2 equivalents of —NCO per equivalent of active hydrogen, and preferably a ratio of about 0.9 to 1.1 equivalents.

The foaming operation is effected by water, by liquefied fluorocarbon gases which have boiling points below about 80° F. and above —60° F., or by other inert gases such as nitrogen, carbon dioxide, methane, helium and argon. The liquefied gases are saturated aliphatic fluoro-hydrocarbons which vaporize at or below the temperature of the foaming mass. Such gases are at least partially fluorinated and can also be otherwise halogenated.

Fluorocarbon blowing agents include trichloromonofluoromethane; dichlorodifluoromethane, dichlorofluoromethane; 1,1 - dichloro-1-fluoroethane; 1-chloro-1,1-difluoro, 2,2-dichloroethane; and 1,1,1-trifluoro, 2-chloro-2-fluoro, 3,3-difluoro-4,4,4-trifluorobutane. The amount of blowing agent used will vary with density desired in the foaming product. In general, it may be stated that for 100 grams of resin mix containing an average NCO/OH ratio of 1 to 1, about 0.005 to 0.3 mole of gas is used to provide densities ranging from 30 to 1 pounds per cubic foot. If desired, water can be used in conjunction with the inert gas or fluorocarbon blowing agent, or water can be used as the only blowing agent.

Catalysts that are suitable for accelerating the polyether-isocyanate reaction include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts.

Among the organo-tin compounds that deserve particular mention are stannous acylates such as stannous acetate, stannous octoate, stannous laurate, stannous oleate and the like; stannous alkoxides such as stannous butoxide, stannous 2-ethylhexoxide, stannous phenoxide, o-, m- and p-stannous cresoxides, and the like; dialkyl tin salts of carboxylic acids, e.g., dibutyltin diacetate, dibutyltin dilaurate, dibutyltin maleate, dilauryltin diacetate, dioctyltin diacetate, and the like. Similarly, there can be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

The tertiary amines which are useful as catalysts in the formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N-cocomorpholine), N,N,N',N'-tetramethylethylenediamine, N,N,N',N'-tetramethyl - 1,3 - propanediamine, triethylenediamine (1,4-diazabicyclo[2.2.2]octane), triethylenetetramine, N,N-dimethylbenzylamine, N,N-dimethylcyclohexylamine, benzyltriethylammonium bromide, bis-(N,N-diethylaminoethyl) adipate, N,N-diethylbenzylamine, N-ethylhexamethylene - amine, N-ethylpiperidine, alpha - methylbenzyldimethylamine, dimethylhexadecylamine, 3-methylisoquinoline, dimethylcetylamine, and isocyanates and metal compounds containing tertiary nitrogen atoms.

Typical tertiary amines containing active hydrogen atoms reactive with isocyanate groups include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine, and the like. Still other tertiary amines containing active hydrogen atoms reactive with isocyanate groups include polyesters based on polyols such as illustrated above including triethanolamine, triisopropanolamine, N-alkyl diethanolamines, and the like, as well as polycarboxylic acids containing tertiary nitrogen atoms.

Other catalysts suitable for use in the formulations of this invention include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth and titanium; polystannates; tin, titanium and copper chelates; and mercury salts. Representative members of this class of catalysts are stannic chloride, stannic bromide, stannic iodide, stannic fluoride, isopropoxysteoroxy polystannate, hydroxysteoroxy polystannate, tin chelates such as bis(acetylacetone)tin dichloride, arsenic trichloride, antimony trichloride, antimony pentachloride, antimony tributoxide, bismuth trichloride, titanium tetrachloride, bis(cyclopentadienyl)-titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, mercurous chloride, mercuric acetate, tributyl arsine, triphenyl stibine, trioctylbismuthine, octylarsine, phenyldimercaptoarsine, butyldichlorobismuthine, triphenylstibine iodide cyanide, isoamylarsenic disulfide, triethylstibine oxide, octylarsonic acid, dibutylstibinic acid, phenylarsenic dilaurate, butylbismuth dibenzenesulfonamide, arsenopropane, and bis-(dibutylbismuth)oxide.

The amount of catalyst to be employed in urethane foam formulations is well understood by persons skilled in the urethane resin foam art. In general, the amount of amine catalyst employed is between about 0.05 and 0.2 part by weight per 100 parts by weight of polyether and the amount of organo-metal catalyst is between about 0.05 and about 0.8 part by weight per 100 parts by weight of polyether. Tertiary amine catalysts are preferably used in amounts between about 0.1 and 0.15 part by weight per 100 parts by weight of polyether and organo-tin catalysts are preferably used in amounts of about 0.2 part by weight per 100 parts by weight of polyether.

The amount of hydrolytically stable siloxane-oxyalkylene block copolymer employed as a foam stabilizer in the formulations of this invention can vary over wide limits from about 0.1 weight percent to 10 weight percent or greater. [Weight percentages are based on the total weight of the foam formulation, that is, the polyether, isocyanate, catalyst, water (if present) and foam stabilizer.] There is no commensurate advantage to using amounts of foam stabilizer greater than about 10 weight percent. Preferably, the amount of siloxane-oxyalkylene block copolymer present in the foam formulations varies from about 0.5 weight percent to about 2.0 weight percent.

It has been discovered that for use as a foam stabilizer the hydrolytically stable siloxane-oxyalkylene block copolymer should preferably have a molecular weight of from about 3000 to about 12,000. Within this molecular weight range, the preferred foam stabilizers have a siloxane block content which varies from about 10 weight percent (based on the total weight of siloxane and oxyalkylene blocks in the copolymer) for copolymers having molecular weights of about 3000 up to about 50 weight percent for copolymers having molecular weights of about 12,000.

A particularly useful process for making urethane foams from the foam formulations of this invention comprises the steps of (1) combining at a temperature between about 15° C. and about 50° C. separate mixtures comprising (i) a polyether (or mixture of polyethers), an organo-tin catalyst, a tertiary amine catalyst and water, and (ii) an organic isocyanate, or mixture of organic isocyanates) and a hydrolytically stable siloxane-oxyalkylene block copolymer (or mixture of such block copolymers), (2) maintaining the combined mixture at a temperature between about 15° C. and about 50° C. until the foaming reaction commences, (3) pouring the foaming reaction mixture into a suitable mold maintained at between about 15° C. and about 50° C., and (4) curing the resulting foam by heating the foam at a temperature between about 100° C. and about 150° C. This process represents an embodiment of the one-shot technique and produces flexible, semi-rigid or rigid polyurethane foams depending on the nature (functionality) of the polyether or polyethers employed. The amount of siloxane-oxyalkylene copolymer employed in the formulations used in this preferred process is the same as described hereinabove. The amounts of the other ingredients are those conventionally employed in one-shot processes for producing polyurethane foams. The foams produced by this process have densities in the range of about 2.0 to 2.2 pounds per cubic foot.

The heating step (4) described in the preceding paragraph is not essential, but heating cures the foamed product to a stable, tack-free, resin foam capable of supporting a load within a relatively short period of time (in the order of about five minutes to thirty minutes), whereas longer times are required to obtain a cured, tack-free resin at room temperature. Also, the pouring step (3) is not essential since the mixtures (i) and (ii) can be combined and the foaming reaction commenced and completed in the desired mold.

Another particularly advantageous use of the hydrolytically stable siloxane-oxyalkylene foam stabilizers is in the process for making rigid urethane resin foams. The prepolymer process is conventionally used in making rigid foams. An initial step in this process comprises combining (i) an organic isocyanate-rich prepolymer mix and (ii) a polyether or a pre-mixture of polyether and one or more catalysts, and thereafter adding a foam stabilizer. The hydrolytic stability of the above-described siloxane-oxyalkylene block copolymer makes it possible to prepare mixtures of these foam stabilizing copolymers with either (i) an organic isocyanate-rich prepolymer mix or (ii) a polyether or combination of polyether and amine or organo-metal catalyst along with, if desired, a blowing agent. These "pre-mixtures" can be stored or shipped without degradation of the foam stabilizers or the catalysts. Another problem associated with such pre-mixtures is the lack of compatibility of the various components. If the components are not compatible, they will separate during storage and it is necessary to remix them prior to producing the foam. Certain siloxane-oxyalkylene copolymeric foam stabilizers employed in this invention are especially well suited for producing stable pre-mixtures of the above-described type. More especially, copolymers represented by Formula 1 or Formula 2 wherein R' or R''' is a hydrogen atom and wherein the hydroxyl group represented by R'O or R'''O represents at least 1.5 weight percent of the copolymers have been found particularly useful in producing stable pre-mixtures.

Siloxane-oxyalkylene copolymers represented by Formula 1 wherein the R' $(OC_mH_{2m})$-group [or copolymers represented by Formula 2 wherein the $$R'''(OC_2H_4)_x(OC_3H_6)_y$$

group] has a molecular weight of at least about 550 are very viscous liquids, gums, soft solids or solids. Such copolymers can be fluidized by heating prior to use in the foam formulations of this invention. It is preferable, however, to employ such copolymers dissolved in liquid organic compounds which are not reactive with the copolymer. Suitable solvents include hydrocarbons (such as toluene) and oxyalkylene compounds such as those having the formula $ZO(C_2H_4O)_aZ$ wherein Z is a hydrogen atom or an alkyl group containing from 1 to 4 carbon atoms (e.g. the methyl, ethyl, propyl or butyl groups) and $a$ has a value from 1 to 3. Typical of the solvents represented by the latter formula are the monomethyl ether of ethylene glycol, the monobutyl ether of ethylene glycol, the diethyl ether of diethylene glycol, the dimethyl ether of ethylene glycol and the monomethyl ether of triethylene glycol $[CH_3O(C_2H_4O)_3H]$. Other useful solvents are esters (such as ethylene glycol monoacetate, N-butyl acetate) and dioxane. Preferably the solutions contain from 25 to 90 parts by weight of the copolymer and from 10 to 75 parts by weight of the solvent per 100 parts by weight of the solution. More desirably the solutions contain from 50 to 75 parts by weight of the copolymer and from 25 to 50 parts by weight of the solvents per 100 parts by weight of the solution. Surprisingly, it has been found that the use of such solvents produces rigid foams having greater dimensional stability and fewer internal flows.

The following examples illustrate the present invention:

EXAMPLE 1

An allyl-terminated polyoxyalkylene ether having the average formula

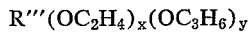

$$C_4H_9(OC_2H_4)_{27}(OC_3H_6)_{27}OCH_2CH=CH_2$$

and a dimethylpolysiloxane containing an average of about two non-terminal, silicon-bonded hydrogen atoms per molecule and represented by the average formula:

(E-1)

wherein the sum of $w$, $y$ and $z$ is about 16, were prepared by conventional procedures. The allyl-terminated polyoxyalkylene ether and the siloxane of Formula E-1, in a 2 to 1 mole ratio, were mixed together in toluene solvent and heated at about 120° C. in the presence of chloroplatinic acid catalyst to produce a siloxane-oxyalkylene block copolymer having the average formula:

(E-2)

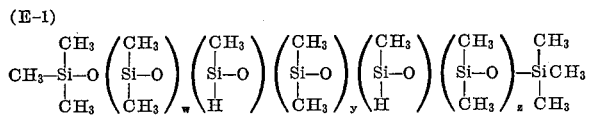

where the sum of $w$, $y$ and $z$ is about 16.

A composition suitable for producing polyurethene foams was then prepared from the following materials:

(a) A polyether having the average formula:

Grams $HO(C_3H_6O)_{34}H$ -------------------- 225

(b) A polyether having the average formula:

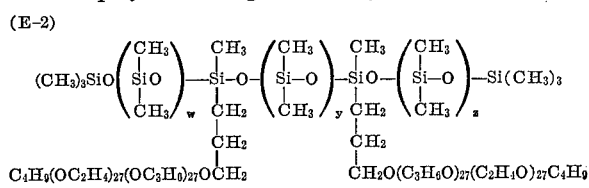 }225

(c) Toluene diisocyanate ---------------- 165.5
(d) Stannous octoate -------------------- 3.0
(e) Triethylamine ---------------------- 0.3
(f) Water ------------------------------- 12
(g) Siloxane-oxyalkylene copolymer having the average Formula E-2 ---------------- 3.75

The siloxane-oxyalkylene copolymer was dissolved in the toluene diisocyanate. The stannous octoate and the two polyethers were then mixed and stirred. The water and triethylamine were then mixed and added to the stannous octoate-polyether mixture, and the combined mixture was heated to 35° C. with vigorous stirring. Heating was then stopped and the clear solution was stirred for eight seconds with the stirrer turning at 2000 r.p.m. The siloxane-oxyalkylene polymer-toluene-diisocyanate solution was then added, the resulting foam formulation stirred for five seconds, and the formulation was then poured into a waxed paper-lined box about 12 inches square. The foam mixture rose steadily to fill the box to a height of 7.25 inches, at which point the reaction product "gelled" and the foamed structure stabilized. The foam was then cured in an oven for fifteen minutes at 130° C. The cured foam was flexible and had slightly coarse, surface cells.

A similar flexible foam product was obtained when the compound of Formula E-2 was employed in about one-half the above concentration, namely, 1.9 grams of foam stabilizer, in an otherwise identical foam formulation.

EXAMPLE 2

A methyl-terminated, dimethylpolysiloxane having an average molecular weight of about 1500 and containing an average of about four non-terminal, silicon-bonded hydrogen atoms per molecule was prepared by conventional procedures. A series of four hydrolytically stable siloxane-oxyalkylene block copolymers was prepared by the platinum-catalyzed reaction of this polysiloxane with about one, two, three and four mole equivalents, respectively, of a methallyl-terminated polyoxyalkylene ether having the average formula

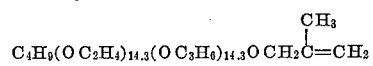

The resulting copolymers (E-3, E-4, E-5 and E-6) contained, respectively, about one, two, three and four oxyalkylene blocks per siloxane block. The four copolymers were evaluated as foam stabilizers for polyurethane foam formulations according to the procedure of Example 1. The results are summarized in Table I.

TABLE 1

| Siloxane-oxyalkylene block copolymer | Oxyalkylene block: siloxane block ratio | Foam height, inches | Foam cell structure |
|---|---|---|---|
| E-3 | 1:1 | 1¾ | |
| E-4 | 2:1 | 7 | Flexible, uniform, slightly coarse. |
| E-5 | 3:1 | 7¼ | Do. |
| E-6 | 4:1 | 6¾ | Do. |

Good results are obtained when a copolymer having the formula given below is substituted for copolymer (E-2) in the process of Example 1:

(E-7)

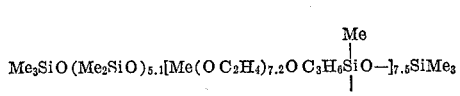

For the sake of brevity, symbols and abbreviations will be used in the examples presented below:

(A) Siloxane-oxyalkylene copolymers

| Abbreviation | Formula |
|---|---|
| (E-8) | $Me_3SiO(Me_2SiO)_{11}(HOCH_2CH_2OCH_2CH_2CH_2\underset{\underset{Me}{\|}}{Si}iO-)_{8.6}SiMe_3$ |
| (E-9) | $Me_3SiO(Me_2SiO)_{8.5}[Me(OC_2H_4)_{16}OC_3H_6\underset{\underset{Me}{\|}}{Si}iO-]_{3.5}SiMe_3$ |
| (E-10), (E-11) and (E-12) are represented by the general formula appearing on the right where x has the value shown below: | $Me_3SiO(Me_2SiO)_{8.5}[H(OC_2H_4)_xOC_3H_6\underset{\underset{Me}{\|}}{Si}iO-]_{3.5}SiMe_3$ |
| (E-10) | x=13.5 |
| (E-11) | x=17.5 |
| (E-12) | x=20 |
| (E-13)* | $CH_3Si[(OSiMe_2)_{6.2}(OC_2H_4)_{18}(OC_3H_6)_{14}OBu]_3$ |
| (E-14) | $Me_3SiO(Me_2SiO)_{21}[Bu(OC_2H_4)_{18}(OC_3H_6)_{14}OC_3H_6\underset{\underset{Me}{\|}}{Si}iO-]_{3.5}SiMe_3$ |
| (E-15) | $Me_3SiO[Me(OCH_2CH_2)_3OCH_2CH_2CH_2\underset{\underset{Me}{\|}}{Si}iO-]_3SiMe_3$ |

*Copolymer (E-13) contains oxyalkylene blocks linked to a siloxane block by hydrolytically unstable carbon to oxygen to silicon bonds. The other copolymers above are of the hydrolytically stable variety employed in this invention.

(B) Polyethers (P-1)—This polyether is produced by reacting sucrose and propylene oxide and has a hydroxyl number of about 490. Polyether (P-1) is sold under the designation "PPG-6406."

(P-2)—This polyether is produced by reacting sorbitol and propylene oxide and has a hydroxyl number of about 490. Polyether (P-2) is sold under the designation "G-257."

(P-3)—This polyether is produced by reacting sucrose and propylene oxide and has a hydroxyl number of about 490. Polyether (P-3) is sold under the designation "RS-450."

(P-4)—This polyether is produced by reacting sorbitol and propylene oxide and has a molecular weight of about 700.

(P-5)—This polyether is produced by reacting glycerol and ethylene oxide and has a hydroxyl number of 56.

(P-6)—This polyether is produced by reacting one mole of glycerol first with one mole of propylene oxide and then with three moles of ethylene oxide. Polyether (P-6) has a hydroxyl number of 45.

(C) Solvent (S-1)—$C_4T_9(OC_3H_6)_xOH$ having a molecular weight of 400.

Copolymer (E-8) is prepared by reacting allyloxy ethanol with the corresponding siloxane containing SiH in the presence of a platinum catalyst by conventional techniques. Copolymers (E-10), (E-11), (E-12) are produced by first reacting allyl alcohol and ethylene oxide at superatmospheric pressure and at an elevated temperature by known techniques to produce a polyethylene oxide endblocked at one end and by an allyl group and at the other end by a hydroxyl group. The latter material is then reacted with a siloxane containing SiH in the presence of a platinum catalyst by conventional techniques. The latter reaction is preferably conducted in a suitable solvent to reduce the tendency of the siloxane-oxyalkylene copolymer produced in the reaction to gel. Suitable solvents include compounds having the formula:

$$RO(C_3H_6O)_xH$$

where R is a lower alkyl group and x has a value from one to twenty (e.g. $C_4H_9O(C_3H_6O)_{13}H$). It is often desirable not to isolate the copolymer from such solvents in which they are formed but rather to employ the solution of the copolymer in stabilizing urethane foams in accordance with the practice of this invention.

EXAMPLE 3

The following mixtures were prepared:

| | Grams |
|---|---|
| Mixture A: | |
| Polyether (P-1) | 100 |
| A mixture of 1.8 grams N, N-dimethyl ethanol amine and 0.1 gram of triethylene diamine | 1.1 |
| Surfactant: either a solution composed of 50 weight percent (E-8) and 50 weight percent of (S-1) or (E-9) | 0.9 |
| $CFCl_3$ | 50.0 |
| Mixture B: | |
| Polyether (P-2) | 100 |
| N,N-dimethyl ethanol amine | 0.89 |
| Dibutyl tin dilaurate | 1.0 |
| Surfactant=either a solution composed of 50 weight percent (E-8) and 50 weight percent (S-1) or (E-9) | 1.2 |
| $CFCl_3$ | 50.0 |
| Mixture C: | |
| Polyether (P-3) | 66.7 |
| $(C_2H_5O)_2P(O)CH_2N(C_2H_4OH)_2$* | 33.3 |
| Dibutyl thin dilaurate | 0.3 |
| TMBDA ** | 0.7 |
| Surfactant=either a solution composed of 50 weight percent (E-8) and 50 weight percent (S-1) or E-9) | 2.5 |
| $CFCl_3$ | 50.0 |

*Flame retardant.
**N,N,N',N'-tetramethyl-1,3-butane diamine.

The components of the above mixtures were thoroughly mixed and then centrifuged for 2 hours at 1000 revolutions per minute. The centrifuge tubes in which the mixtures were centrifuged were so designed that they were provided with graduated and tapered bottoms in which any $CFCl_3$ that separated would collect. The amount of $CFCl_3$ so collected after the centrifuging operation is a measure of the compatibility of the mixture. The following results were obtained.

TABLE IV

| Copolymer | Milliliters of $CFCl_3$ separated | | |
|---|---|---|---|
| | Mixture A | Mixture B | Mixture C |
| (E-8)-(S-1) solution | 0 | 0 | 0.05 |
| (E-9) | 0.8 | 0.1 | 3.0 |

These results clearly show that a siloxane-oxyalkylene copolymer [copolymer (E-8)] having hydroxyl end-blocking groups on the oxyalkylene portion enhances compatibility of such mixtures while a siloxane-oxyalkylene copolymer [copolymer (E-9)] which has alkoxy endblocking groups on the oxyalkylene portion does not have this effect.

EXAMPLE 4

The following foam formulations were prepared:

| Formula A: | Grams |
|---|---|
| Polyether (P-1) | 150.0 |
| A mixture of 1.8 grams of N,N-dimethyl ethanol amine and 0.1 grams of triethylene diamine | 1.6 |
| Surfactant: either (E-9) or a solution composed of 50 weight percent (E-8) and 50 weight percent (S-1) | 0.22 |
| CFCl₃ | 75 |
| Crude tolylene diisocyanate ("Nacconate 4040") | 138.0 |
| Formula B: | |
| Polyether (P-2) | 150.0 |
| N,N-dimethyl ethanol amine | 1.38 |
| Dibutyl tin dilaurate | 1.50 |
| Surfactant: either (E-9) or a solution composed of 50 weight percent (E-8) and 50 weight percent (S-1) | 0.11 |
| CFCL₃ | 75.0 |
| Crude tolylene diisocyanate ("Nacconate 4040") | 140.0 |
| Formula C: | |
| Polyether (P-3) | 100.0 |
| $(C_2H_5O)_2P(O)CH_2N(C_2H_4OH)_2$* | 50.0 |
| Dibutyl tin dilaurate | 0.45 |
| TMBDA** | 1.3 |
| Surfactant=either a solution composed of 50 weight percent (E-8) and 50 weight percent (S-1) or (E-9) | 0.45 |
| CFCl₃ | 75.0 |
| Polymethylene polyphenyl isocyanate *** | 163.0 |

*Flame retardant.
**N,N,N',N'-tetramethyl-1,3-butane diamine.
***This material has the formula

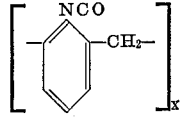

The latter material is sold by Carwin Company under the designation PAPI and has the following properties:

| Isocyanate equivalent (dibutylamine) | 133.5 |
|---|---|
| Viscosity (centipoises at 25° C.) | 250 |
| Hydrolyzable Chloride (percent) | 0.35 |
| Specific gravity (20/20° C.) | 1.2 |
| Flash point, °F. (Cleveland Open Cup) | 425 |
| NCO content by weight, percent (minimum) | 31 |
| Insoluble solids content | nil |

It should be noted that, that since (E-8) was employed in the form of a 50 weight percent solution of these formulations, only one-half as much (E-8) was employed as (E-9).

In each instance, all of the ingredients of the formulas other than the isocyanate where premixed for 10 seconds using a stirrer rotating at 2300 revolutions per minute. Then the isocyanate was added and the foam formulation so formed was mixed for an additional 10 seconds at a stirrer speed of 2300 revolutions per minute. Thereupon the foam formulations were cured in an "L-shaped" mold. The mold consisting of a horizontal section and a vertical section joined at an angle of 90° and having an L-shaped closed section. The mold was designed to produce an integral molded product consisting of two sections, one vertical and one horizontal joined together at a right angle so as to have an L-shaped vertical cross section. Prior to introducing the foam formulation into the mold, the mold was heated to 150° F. and coated with a wax release agent. Heating was discontinued and, when the mold had cooled to 120° F., the foam formulation was introduced and allowed to rise due to the curing reaction without the application of external heating. Then the mold was put in an oven in order to further cure the formulation and to melt the wax release agent. The molded foamed product was then removed from the mold. The height of the vertical section of the molded product (rise) was noted and the cells per linear inch of the molded product (CPI) were determined. The following results were obtained for formulations A, B, and C.

TABLE V

| | Molded products | | | | | |
|---|---|---|---|---|---|---|
| | Formula A | | Formula B | | Formula C | |
| Stabilizer | Rise, inches | CPI | Rise, inches | CPI | Rise, inches | CPI |
| (E-8)-(S-1) solution | 15.5 | 50 | 16.4 | 33 | 14.9 | 42 |
| (E-9) | 14.5 | 41 | 14.8 | 37 | 16.5 | 47 |

In all cases good molded products were produced as shown by the above results.

EXAMPLE 5

Four foam formulations were prepared containing the following ingredients:

| | Grams |
|---|---|
| Polyether (P-3) | 100 |
| $(C_2H_5O)_2P(O)CH_2N(C_2H_4OH)_2$ | 50 |
| Copolymer (E-9), (E-10), (E-11), or (E-12) | 0.45 |
| Dibutyl tin dilaurate | 0.45 |
| TMBDA* | 1.27 |
| CFCl₃ | 75.0 |
| PAPI** | 163 |

*N,N,N',N'-tetramethyl-1,3-butane diamine.
**Described in Example 4.

Premixture of all the above ingredients other than the isocyanate were prepared and the compatibility of the premixtures was noted. Then the foam formulations were mixed and cured in an "L-shaped" mold in the manner descibed in Example 4. The following results were obtained:

TABLE VI

| Copolymers | Weight percent OH in copolymers | Compatibility of premix | Foam rise (inches) | CPI |
|---|---|---|---|---|
| (E-9) | None | No | 18.0 | 42.5 |
| (E-10) | 1.87 | Yes | 15.5 | 35 |
| (E-11) | 1.52 | Yes | 15.3 | 42.5 |
| (E-12) | 1.37 | No | 10.5 | 30 |

The above results illustrate the importance of having at least about 1.5 weight percent OH in the copolymers to insure optimum compatibility of the ingredients of the premixture. In all cases, good molded products were produced.

EXAMPLE 6

Three foam formulations were prepared. In each instance the foam stabilizer employed was copolymer (E-9) dissolved in a solvent. Aside from the solvents employed, the three foam formulations were identical. The solvents employed were: 2-methoxy ethanol; N-butyl acetate; dioxane.

The components of the foam formulations were as follows:

| | Grams |
|---|---|
| Polyether (P-4) | 158 |
| CFCl₃ | 79 |
| Dibutyl tin dilaurate | 1.1 |
| (E-9) | 2.34 |
| Solvent | 0.78 |
| Quasi-prepolymer* | 210 |

*This quasi-prepolymer is a reaction product of polyether (P-4) and tolylene diisocyanate. The reactants were used in such proportions that the quais-prepolymer has 30 weight percent free isocyanate groups.

These foam formulations were cured in an L-shaped mold as described in Example 4. In each instance the molded foam product contained few irregular cells, less defoamed non-cellular portions and fewer elongated cells than when no solvent was employed. However, even in the absence of a solvent a satisfactory molded foam product is produced.

EXAMPLE 7

A foam formulation was prepared identical with the foam formulation of Example 6 with the exception that 1.17 grams of tolylene was used as the solvent. The formulation was cured in an L-shaped mold as described in Example 4. The foamed molded product so produced was cut into eleven strips each having an L-shaped cross section. The strips were maintained at −25° C. for 16 hours. The angle between the two sections of each strip were then measured and the deflection from 90° was found to be 1.9° on the average. This experiment was repeated twice again omitting the toluene solvent. Average deflections of 9.2° and 10.7° were noted. These experiments illustrate the desirability of employing solvents for the siloxane-oxyalkylene copolymers foam stabilizer.

EXAMPLE 8

Four foam formulations for producing flexible foams were prepared containing the following ingredients:

| | Grams |
|---|---|
| Polyether (P-5) | 350 |
| Water | 15.75 |
| Diethylene triamine | 0.7 |
| Copolymer (E-13) or (E-14) | As indicated |
| Mixture of isocyanates* | 189.9 |
| Stannous octoate | 1.3 |

*The mixture was composed of 80 percent of 2,4-tolylene diisocyanate and 20 weight percent of 2,6-tolylene diisocyanate.

The foam formulation was formed in the following manner. The copolymer was added to the polyether then a mixture of the amine and water was added. These ingredients were mixed manually with a stirrer then the stannous octoate was added, and the mixture was stirred for 8 seconds with a propeller revolving at 2000 revolutions per minute. The mixture of diisocyanate was added and the foam formulation so formed was stirred with a propeller revolving at 2000 revolutions per minute for 7 seconds. The formulation was put in a 12 inch x 12 inch box and cured for 15 minutes at 130° C. The foams were observed for the foam rise in inches, for foam collapse both on the top and the bottom of the foam, for the number of cells per linear inch and the cell uniformity. The results are tabulated below:

TABLE VI

| | (E-13) | (E-14) | (E-13) | (E-14) |
|---|---|---|---|---|
| Grams of copolymer | 7 | 7 | 2.45 | 2.45 |
| Foam rise, inches | 8.5 | 8⅞ | 7 | 8.25 |
| Foam collapse, top | Nil | Nil | Nil | 0.25 |
| Foam collapse, bottom | 1 ⅜ | Nil | 1 0.45 | 1 5/16 |
| CPI | 25 | 50 | 7.5 | 45 |
| Cell uniformity | Good | Good | (2) | Good |

1 Dense ridge.
2 Coarse irregular cell structure; foam on verge of boiling.

The above results demonstrate the superior performance of foam formulations containing the hydrolytically stable copolymeric foam stabilizers employed in this invention [(E-14)] as compared to hydrolytically unstable copolymeric foam stabilizers [(E-13)]. This improvement is particularly noticeable at the lower stabilizer concentrations.

EXAMPLE 9

Six foam formulations for producing flexible foams were prepared from the following ingredients:

| | Parts by weight |
|---|---|
| Polyether (P-5) | 100 |
| Water | 4.0 |
| Copolymers (E-13) or (E-14) | As indicated |
| N,N,N',N'-tetramethyl-1,3-butane diamine | 0.1 |
| Stannous octoate | 0.3 |
| N-ethyl morpholine | 0.2 |
| Mixture of isocyantes* | 49.8 |

*The mixture was composed of 80 weight percent of 2,4-tolylene diisocyanate and 20 weight percent of 2,6 tolylene diisocyanate.

A premixture of all the above ingredients other than the diisocyanate was formed and stirred in a drill press with a propeller revolving at 3000 revolutions per minute for 8 seconds. The diisocyanates were added and stirring was continued for 5 seconds. The formulation was cured in an L-shaped mold as described in Example 4 to produce a molded product 1 inch thick. The curing was accomplished in 15 to 20 minutes at a temperature from 135 to 195° C. in the mold. The percent cell rise in the vertical section of the mold was noted (100% would denote that the formula filled the entire vertical section of the mold). The cells per linear inch (CPI) was also noted. The following results were obtained:

TABLE VII

| | Parts by weight | Percent rise | CPI |
|---|---|---|---|
| Copolymer: | | | |
| (E-13) | 1.2 | 93 | 40 |
| (E-14) | 1.2 | 100 | 62.5 |
| (E-13) | 0.6 | 74 | 35 |
| (E-14) | 0.6 | 100 | 57.5 |
| (E-13) | 0.3 | (1) | (1) |
| (E-14) | 0.3 | 99.5 | 05 |

1 Collapsed.

The above results illustrate the superiority of the hydrolytically stable copolymeric stabilizer employed in this invention [(E-14)] over a hydrolytically unstable copolymeric stabilizer [(E-13)].

EXAMPLE 10

Two foam formulations for producing flexible foams were prepared containing the following ingredients:

| | Parts by weight |
|---|---|
| Polyether (P-6) | 100 |
| Water | 4.5 |
| N-ethylene morpholine | 0.6 |
| Copolymers (E-13) or (E-14) | 1.5 |
| Triethylene diamine | 0.15 |
| Stannous octoate | 0.1 |
| $CFCl_3$ | 5.0 |
| Mixtures of isocyanates* | 103 |

*The mixture was composed of 80 weight percent of 2,4-tolylene diisocyanate and 20 weight percent of 2,6-tolylene diisocyanate.

These foam formulations were mixed continuously on an industrial foam machine used to produce automotive seat cushions. Stirring of the ingredients is accomplished using a stirrer rotating at 5,000 revolutions per minute. The formulation was molded at 115° F. then the formulation was cured for 4.5 minutes at 350° F. and post cured for one hour at 250° F. Flaws in the foams caused 38% of the foams produced from the formulations containing copolymer (E-13) to be rejected whereas there were no rejections on foams produced from formulations containing (E-14). These results illustrate the advantages obtained when hydrolytically stable copolymeric stabilizers (E-14) are employed as compared to the results obtained when hydrolytically unstable copolymeric stabilizers are employed (E-13).

EXAMPLE 11

A foam formulation for producing a rigid foam was prepared containing the following ingredients:

| | Grams |
|---|---|
| Polyether (P-4) | 100.5 |
| Dibutyltin dilaurate | 1.26 |
| Copolymer (E-15) | 2.67 |
| $CFCl_3$ | 90.6 |
| Mixture of diisocyanates* | 240 |

*The mixture was composed of 80 weight percent of 2,4-tolylene diisocyanate and 20 weight percent of 2,6-tolylene diisocyanate.

A premixture was formed of all the above ingredients other than the diisocyanate then the diisocyanates were added rapidly to the premixture which was then stirred for 15 seconds at 3,000 revolutions per minute. The foam formulations was then cured in an L-shaped mold as described in Example 8. The foam had good rise and a finer, more uniform cell structure than one prepared under similar conditions without copolymer (E-15). The volume of the foam containing (E-15) was 595 cu. in. whereas the volume of the foam that did not contain copolymer (E-15) was 4343 cu. in.

What is claimed is:

1. A one-shot process for producing a flexible polyurethane foam which comprises forming a mixture of a major amount of a polyether containing at least two hydroxyl groups and having a molecular weight of about 1800 to 5000 and an organic polyisocyanate, a catalytic amount of a catalyst for the production of the polyurethane foam, a minor amount of a blowing agent and a foam stabilizing amount of a siloxane-oxyalkylene copolymer having the formula:

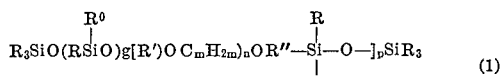
(1)

wherein R is a monovalent hydrocarbon group, $R^0$ is a member selected from the group consisting of hydrogen and a monovalent hydrocarbon group, R' is hydrogen or a monovalent hydrocarbon group, R" is a divalent hydrocarbon group, $g$ has a value of at least 0, $m$ is an integer that has a value of at least 2, $n$ is a number that has a value of at least 1, $p$ is a number that has a value of at least 1, there are no more than three hydrogen atoms represented by $R^0$ in the copolymer, and at least 25 weight percent of the groups represented by $(OC_mH_{2m})$ are oxyethylene groups; and foaming and curing said mixture.

2. The process of claim 1 wherein the copolymer has the formula:

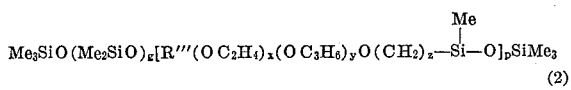
(2)

wherein Me is a methyl group, $g$ has a value from 3 to 25 inclusive, R''' is a member selected from the group consisting of a hydrogen and an alkyl group containing from 1 to 4 carbon atoms inclusive, $x$ has a value from 1 to 25 inclusive, $y$ has a value from 0 to 15 inclusive, at least 25 weight percent of the groups represented by

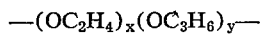

are oxyethylene groups, $z$ has a value from 2 to 3 inclusive, and $p$ has a value from 1 to 10 inclusive.

3. A mixture of a siloxane-oxyalkylene copolymer as defined in claim 1 and a catalyst for the production of polyurethane foam selected from the group consisting of organic amines and tin salts of aliphatic carboxylic acids.

4. The process of claim 1 wherein R' is a monovalent hydrocarbon group.

5. The process of claim 1 wherein the organic polyisocyanate is a tolylene diisocyanate, $p$ has a value of 3, $n$ has a value of at least 4, and R" is a propylene or a butylene group.

6. The process of claim 1 wherein the organic polyisocyanate is a tolylene diisocyanate, $p$ has a value of at least 3, $n$ has a value of at least 4 and R" is a propylene or a butylene group.

7. A process for producing a polyurethane foam which comprises forming a mixture of a major amount of polyether containing at least two hydroxyl groups and an organic polyisocyanate, a catalytic amount of a catalyst for the production of the polyurethane foam, a minor amount of a blowing agent and a solution composed of from 25 to 90 parts by weight of a siloxane-oxyalkylene copolymer having the formula:

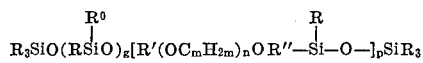

wherein R is a monovalent hydrocarbon group, $R^0$ is a member selected from the group consisting of hydrogen and a monovalent hydrocarbon group, R' is a member selected from the group consisting of a hydrogen and a monovalent hydrocarbon group, R" is a divalent hydrocarbon group, $g$ has a value of at least 0, $m$ is an integer that has a value of at least 2, $n$ is a number that has a value of at least 1, $p$ is a number that has a value of at least 1, there are no more than three hydrogen atoms represented by $R^0$ in the copolymer, at least 25 weight percent of the groups represented by $(OC_mH_{2m})$ are oxyethylene groups; the $R'(OC_mH_{2m})_n$ group in the copolymer has a molecular weight of at least 550 and, the copolymer has a molecular weight from about 3000 to about 12,000 and from 10 to 75 parts by weight of a solvent for the copolymer selected from the group consisting of aromatic hydrocarbons, solvents having the formula:

wherein Z is a member selected from the group consisting of the hydrogen atom and an alkyl group containing from 1 to 4 carbon atoms and has a value from 1 to 3, ester solvents and dioxane, said parts by weight of the copolymer and solvent being based on 100 parts by weight of the solution, said copolymer being present in the mixture in a foam stabilizing amount; and foaming and curing said mixture.

8. A process for producing a polyurethane foam which comprises forming a mixture of a major amount of a polyether containing at least two hydroxyl groups and an organic polyisocyanate, a catalytic amount of a catalyst for the production of the polyurethane foam, a minor amount of a blowing agent and a solution composed of from 25 to 90 parts by weight of a siloxane-oxyalkylene copolymer having the formula:

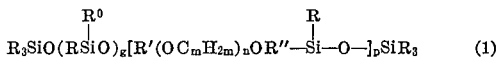
(1)

wherein R is a monovalent hydrocarbon group, $R^0$ is a member selected from the group consisting of hydrogen and a monovalent hydrocarbon group R' is a member selected from the group consisting of a hydrogen and a monovalent hydrocarbon group, R" is a divalent hydrocarbon group, $g$ has a value of at least 0, $m$ is an integer that has a value of at least 2, $n$ is a number that has a value of at least 1, $p$ is a number that has a value of at least 1, there are no more than three hydrogen atoms represented by $R^0$ in the copolymer, at least 25 weight percent of the groups represented by $(OC_mH_{2m})$ are oxyethylene groups; the $R'(OC_mH_{2m})_n$ group in the copolymer has a molecular weight of at least 550 and, the copolymer has a molecular weight from about 3000 to about 12,000 and from 10 to 75 parts by weight of a solvent having the formula:

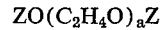

wherein Z is a member selected from the group consisting of the hydrogen atom and an alkyl group containing from 1 to 4 carbon atoms and has a value from 1 to 3, said parts by weight of the copolymer and solvent being based on 100 parts by weight of the solution, said copolymer being present in the mixture in a foam stabilizing amount; and foaming and curing said mixture.

9. A process for producing a polyurethane foam which comprises forming a mixture of a major amount of a polyether containing at least two hydroxyl groups and an organic polyisocyanate, a catalytic amount of a catalyst for the production of the polyurethane foam, a minor amount of a blowing agent and a solution composed of from 25 to 90 parts by weight of a siloxane-oxyalkylene copolymer having the formula:

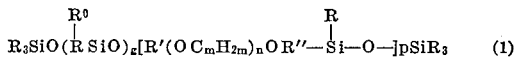
(1)

wherein R is a monovalent hydrocarbon group, $R^0$ is a member selected from the group consisting of hydrogen and a monovalent hydrocarbon group, R' is a member selected from the group consisting of a hydrogen and a monovalent hydrocarbon group, R" is a divalent hydrocarbon group, $g$ has a value of at least 0, $m$ is an integer that has a value of at least 2, $n$ is a number that has a value of at least 1, $p$ is a number that has a value of at least 1, there are no more than three hydrogen atoms represented by $R^0$ in the copolymer, at least 25 weight percent of the groups represented by $(OC_mH_{2m})$ are oxyethylene groups; the $R'(OC_mH_{2m})_n$ group in the copolymer has a molecular weight of at least 550 and, the copolymer has a molecular weight from about 3000 to about 12,000 and from 10 to 75 parts by weight of an aromatic hydrocarbon solvent said parts by weight of the copolymer and solvent being based on 100 parts by weight of the solution, said copolymer being present in the mixture in a foam stabilizing amount; and foaming and curing said mixture.

10. A compatible mixture suitable for use in producing a rigid polyether polyurethane foam by the one-shot process, which mixture comprises a major amount of a polyether containing at least two hydroxyl groups and having a molecular weight of about 250 to about 1500 and a minor amount of a copolymer as defined in claim 2 wherein R' represents a hydrogen atom and the hydroxyl groups represented by R'O constitute at least 1.5 weight percent of the copolymer.

References Cited

UNITED STATES PATENTS 3,398,104  8/1968  Haluska _____ 260—2.5

DONALD E. CZAJA, Primary Examiner

H. S. COCKERAM, Assistant Examiner

U.S. Cl. X.R.

252—182; 260—18, 30.4, 31.2, 33.2, 33.6

UNITED STATES PATENT OFFICE
CERTIFICATE OF CORRECTION

Patent No. 3,507,815  Dated April 21, 1970

Inventor(s) Donald L. Bailey et al.

It is certified that error appears in the above-identified patent and that said Letters Patent are hereby corrected as shown below:

Column 3, line 6 the term "lock" should read --- block ---. Column 3, lines 17-18 the phrase "the various types of oxyalkylene groups" should read --- and various types of other oxyalkylene groups ---. Column 11, line 10 the formula "R'$(OC_mH_{2m})$-" should read --- R'$(OC_mH_{2m})_n$ ---. Column 13, line 51 the symbol "T" in the formula should be --- H ---. Column 14, line 47 the term "thin" should be --- tin ---. In the middle of formula (1) of claim 1 that part of the formula shown as "R')O" should be --- R'(O ---.

In claim 7, line 19 of column 20 after the term "and" the symbol --- a --- should be added.

In claim 8, line 56 of column 20 after the terms "atoms and" the symbol ---a--- should be added.

SIGNED AND SEALED

OCT 6 - 1970

(SEAL)
Attest:

Edward M. Fletcher, Jr.
Attesting Officer

WILLIAM E. SCHUYLER, JR.
Commissioner of Patents